(12) United States Patent
Sawkar et al.

(10) Patent No.: US 12,432,542 B2
(45) Date of Patent: Sep. 30, 2025

(54) VOICE COMMAND WITH EMERGENCY RESPONSE

(71) Applicant: Bank of America Corporation, Charlotte, NC (US)

(72) Inventors: Rohit Sawkar, Charlotte, NC (US); Pratap Dande, St. Johns, FL (US)

(73) Assignee: Bank of America Corporation, Charlotte, NC (US)

( * ) Notice: Subject to any disclaimer, the term of this patent is extended or adjusted under 35 U.S.C. 154(b) by 410 days.

(21) Appl. No.: 18/070,734

(22) Filed: Nov. 29, 2022

(65) Prior Publication Data

US 2024/0179505 A1   May 30, 2024

(51) Int. Cl.
*H04W 4/90* (2018.01)
*G06F 3/01* (2006.01)
*G06F 3/16* (2006.01)
*G06N 20/00* (2019.01)

(52) U.S. Cl.
CPC .............. *H04W 4/90* (2018.02); *G06F 3/017* (2013.01); *G06F 3/167* (2013.01); *G06N 20/00* (2019.01)

(58) Field of Classification Search
CPC .. H04W 4/90; H04M 3/42204; H04M 3/5116; G06N 20/00; G06F 3/017; G06F 3/167; G06F 3/04883
See application file for complete search history.

(56) References Cited

U.S. PATENT DOCUMENTS

| | | | |
|---|---|---|---|
| 11,050,885 B1 | 6/2021 | Yannam et al. | |
| 2014/0370841 A1* | 12/2014 | Roberts | H04W 4/90 |
| | | | 455/563 |
| 2018/0310159 A1* | 10/2018 | Katz | H04M 3/42161 |
| 2025/0211672 A1* | 6/2025 | Kolhe | H04M 3/42068 |

* cited by examiner

*Primary Examiner* — Marcos L Torres
(74) *Attorney, Agent, or Firm* — Weiss & Arons LLP

(57) ABSTRACT

A method triggers a user-definable emergency response in a voice-command based authentication system. The method receives gestures on a mobile device, and provides an interface at the mobile device to trigger an automatic interaction with an artificial intelligence ("AI") engine stored on the mobile device. The AI accesses a database for storing legacy information associated with the caller and runs an application program interface that provides the AI engine access to the legacy information. The AI engine receives the gestures generated by the caller, accesses the database storing legacy information generated by the caller and constructs an emergency profile of the caller. The emergency profile may be based on the legacy information, a machine learning model; and/or a user training session that initializes an emergency response signal threshold level. When the gestures exceed the emergency response signal threshold level, the method may generate the emergency response.

18 Claims, 6 Drawing Sheets

VOICE COMMAND WITH EMERGENCY RESPONSE

CROSS-REFERENCE TO RELATED APPLICATION

Commonly-assigned, U.S. Pat. No. 11,050,885, entitled, "CALL INTERCEPTION HEURISTICS", and that issued on Jun. 29, 2021, is hereby incorporated by reference herein in its entirety.

FIELD OF TECHNOLOGY

Aspects of the disclosure relate to language and voice signal processing. Specifically, the disclosure relates to language and voice signal processing as they relate to emergency situations.

BACKGROUND OF THE DISCLOSURE

Interactive voice response ("IVR") systems provide automated tools for interacting with callers. A caller may initiate contact with an IVR system and provide inputs to the IVR system. The caller inputs may include voice data, text data, physical gestures, and selection of options displayed to the caller. These inputs typically correspond to a caller attempting to express a purpose for contacting the IVR system. The IVR system may use a variety of techniques to discern a meaning of caller inputs and efficiently satisfy the caller's purpose.

It would be desirable to enable a user, using the user's own selection of oral, kinetic or other signals, to inform the IVR as to what the user believes would be the most advantageous routing path for the user's interaction. It would be yet further desirable to enable a user to covertly signal the IVR to initiate a secure alarm protocol as part of a user's input of a transaction that may be taking place under duress.

It would be further desirable to temporarily process the user's transaction and initiate an alarm response to the user's covert signal.

It would be still further desirable to inform a security center (using 911 or other emergency mechanism) of the user's location as determined by the user's mobile device, Wi-Fi location or other suitable Global Positioning System location device or other suitable device. It would also be desirable to trigger any other necessary security responses.

As described herein, a voice command system with emergency responses provides technical solutions for efficiently enabling a caller to implement a pre-determined purpose for contacting an IVR system by placing automated tools, through an IVR system, into a user's discretionary election of voice and other user commands.

SUMMARY

A voice-command based authentication system equipped with a user-definable emergency response is provided. The system may include a mobile device. In operation, the mobile device may receive gestures submitted by a caller. The gestures may involve a transaction. By triggering an emergency response together with transaction instructions, the user may be signaling that the user is performing the transaction under duress and requires emergency help.

The mobile device may also provide an interface to trigger an automatic interaction with an artificial intelligence ("AI") engine stored on the mobile device.

The mobile device may include a database for storing legacy information associated with the caller and for running an application program interface that is compatible with the AI engine and provides the AI engine access to the legacy information.

In operation, the mobile device may run the AI engine such that the mobile device may: receive the gestures generated by the caller, where the gestures may involve the transaction, access the database storing legacy information generated by the caller and construct an emergency profile of the caller. The emergency profile may be based on the legacy information and/or the gestures, a machine learning model and/or a user training session that initializes an emergency response signal threshold level. When the gestures exceed the emergency response signal threshold level, the mobile device generates, using machine learning, the emergency response in response to the gestures.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
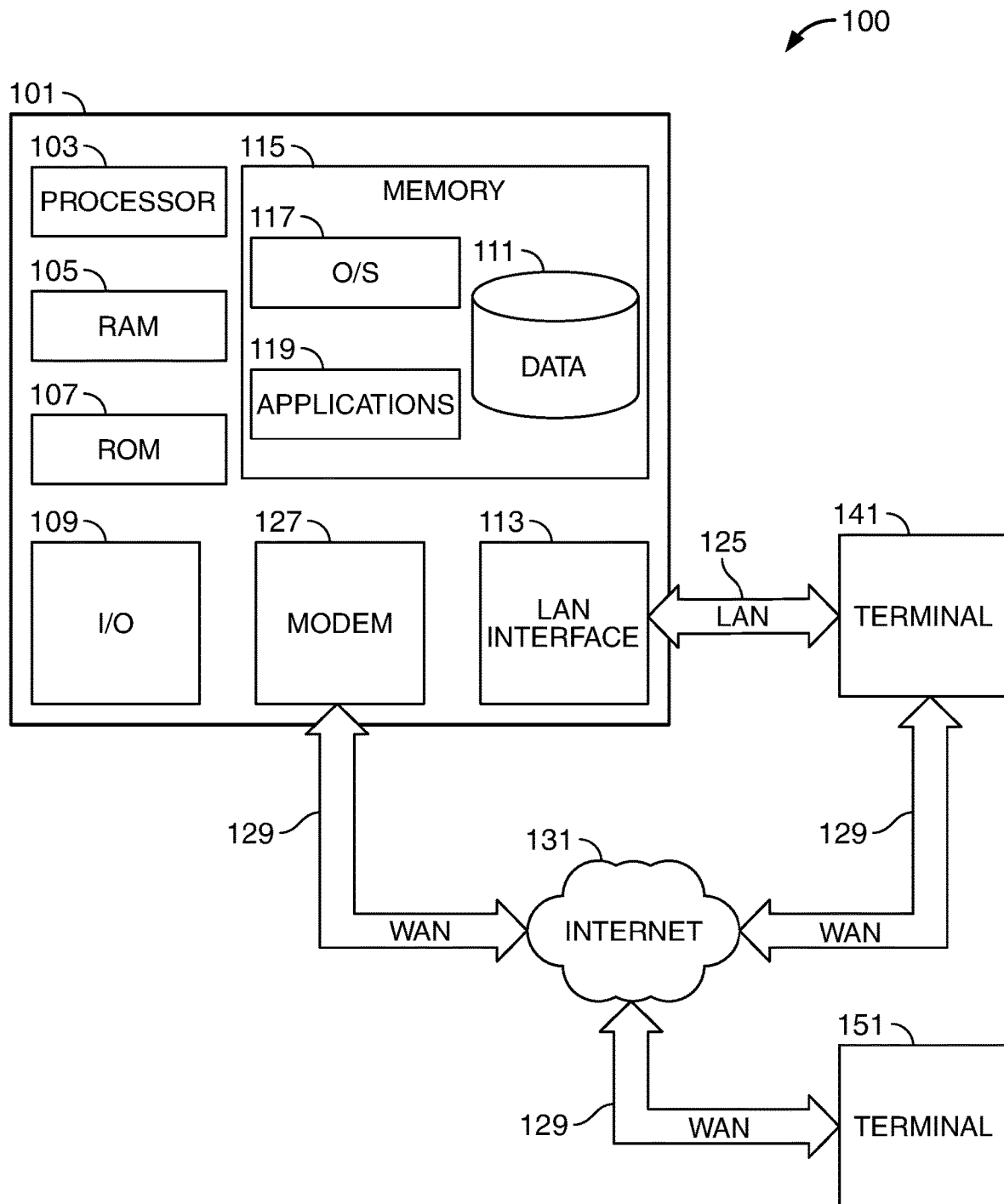
FIG. 1 shows an illustrative system in accordance with principles of the disclosure.

A voice-command based authentication system equipped with a user-definable emergency response is provided. The system may include a mobile device that, in operation, receives voice inputs submitted by a caller and provides an interface to trigger an automatic interaction with an artificial intelligence ("AI") engine stored on the mobile device. The voice inputs may involve a transaction which the caller is intent on flagging as a transaction under duress, or as a transaction under conditions different from normal transacting conditions.

The mobile device includes a database for storing legacy information associated with the caller and for running an application program interface that is compatible with the AI engine and provides the AI engine access to the legacy information and/or the voice inputs.

The AI engine may, in operation: receive the voice inputs generated by the caller; access the database storing legacy information generated by the caller; and construct an emergency profile of the caller based on the legacy information and/or the voice inputs, a machine learning model, and a user training session that initializes an emergency response signal threshold level.

When the voice inputs exceed the emergency response signal threshold level, the mobile device generates, using machine learning, the emergency response in response to the voice inputs. The emergency response may be selected from a group including a text communication channel; a voice communication channel; and/or a video communication channel.

The target of the emergency response is selected from a group comprising: a security center; a law enforcement entity; and/or an alarm system.

The mobile device may be further configured to receive gestures performed by the caller.

In some embodiments, the mobile device may be further configured to run the AI engine to access the database storing legacy information generated by the caller, and to revise the emergency gesture profile of the caller based on some or all of: the legacy information and/or the voice inputs; the machine learning model; and a level of performance of the emergency response signal threshold level. This level of performance of the emergency response signal threshold level may be revised in terms of a signal threshold assorted with a plurality of legacy user voice inputs and/or legacy gestures. The AI engine may be further configured to revise the emergency response signal threshold level as part of the revision of the emergency gesture profile of the caller.

The mobile device may be further configured to run the AI engine, receive the gestures generated by the caller, access the database storing legacy information generated by the caller, and construct an emergency gesture profile of the caller. The emergency gesture profile may be based on: the legacy information and/or the gestures; a machine learning model; and/or a user training session that initializes the emergency response signal threshold level in response to the gestures performed by the caller.

When the gestures performed by the caller exceed the emergency response signal threshold level—e.g., the gestures involve more bodily motion than was originally submitted by the user in determining the emergency signal response and, as such, invoke an emergency response—the mobile device can be configured to generate, using machine learning, the emergency response in response to the gestures.

In some embodiments, the mobile device may be further configured to run the AI engine such that the AI engine, in operation: accesses the database storing legacy information generated by the caller and revises the emergency gesture profile of the caller. The revision may be based on the legacy information and/or the voice inputs, the machine learning model and a level of performance of the emergency response signal threshold level vis-à-vis a plurality of legacy user gestures.

The AI engine may be further configured to revise the emergency response signal threshold level as part of the revision of the emergency gesture profile of the caller.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of communications involving Artificial Intelligence (AI) as detailed herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
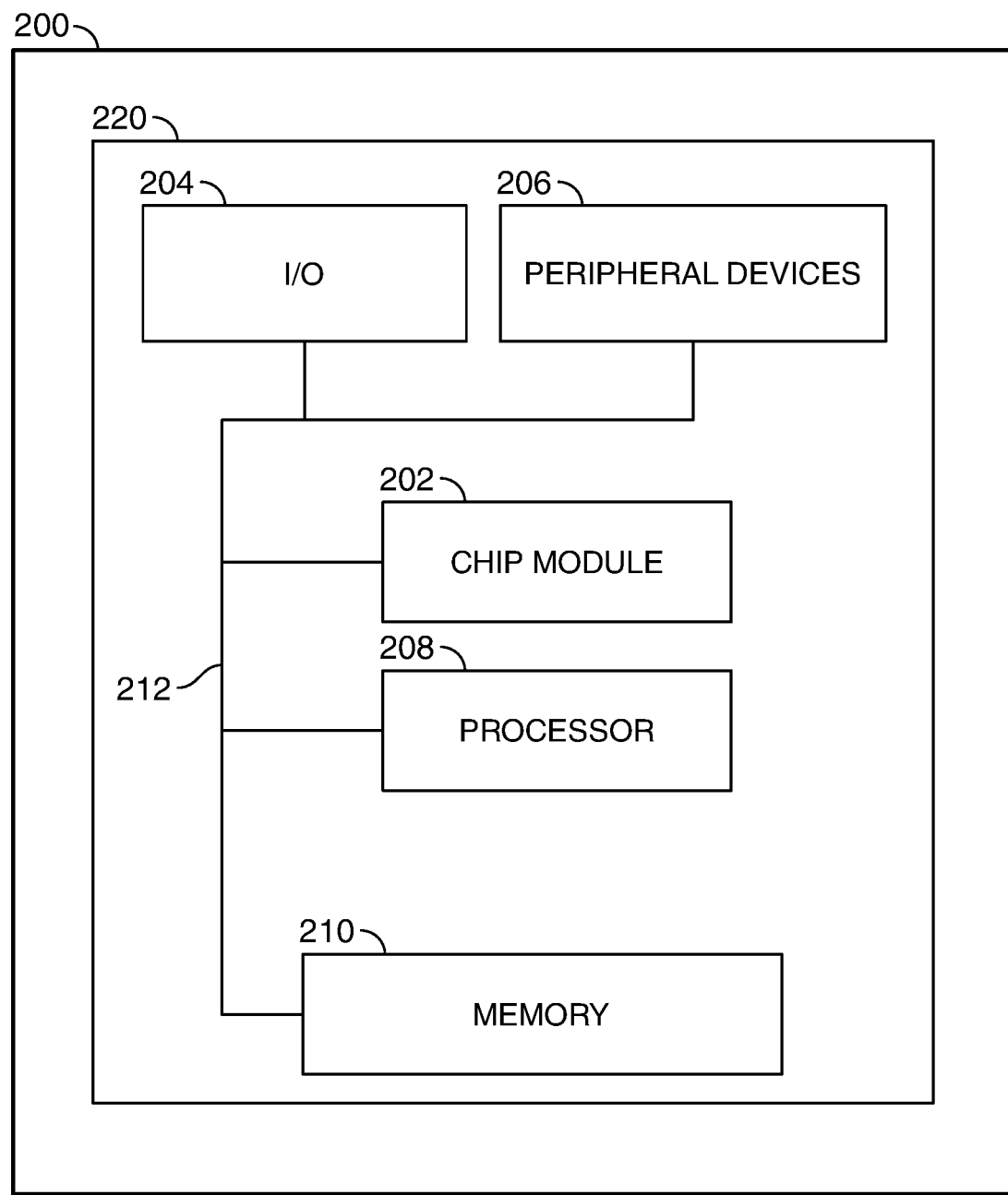
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
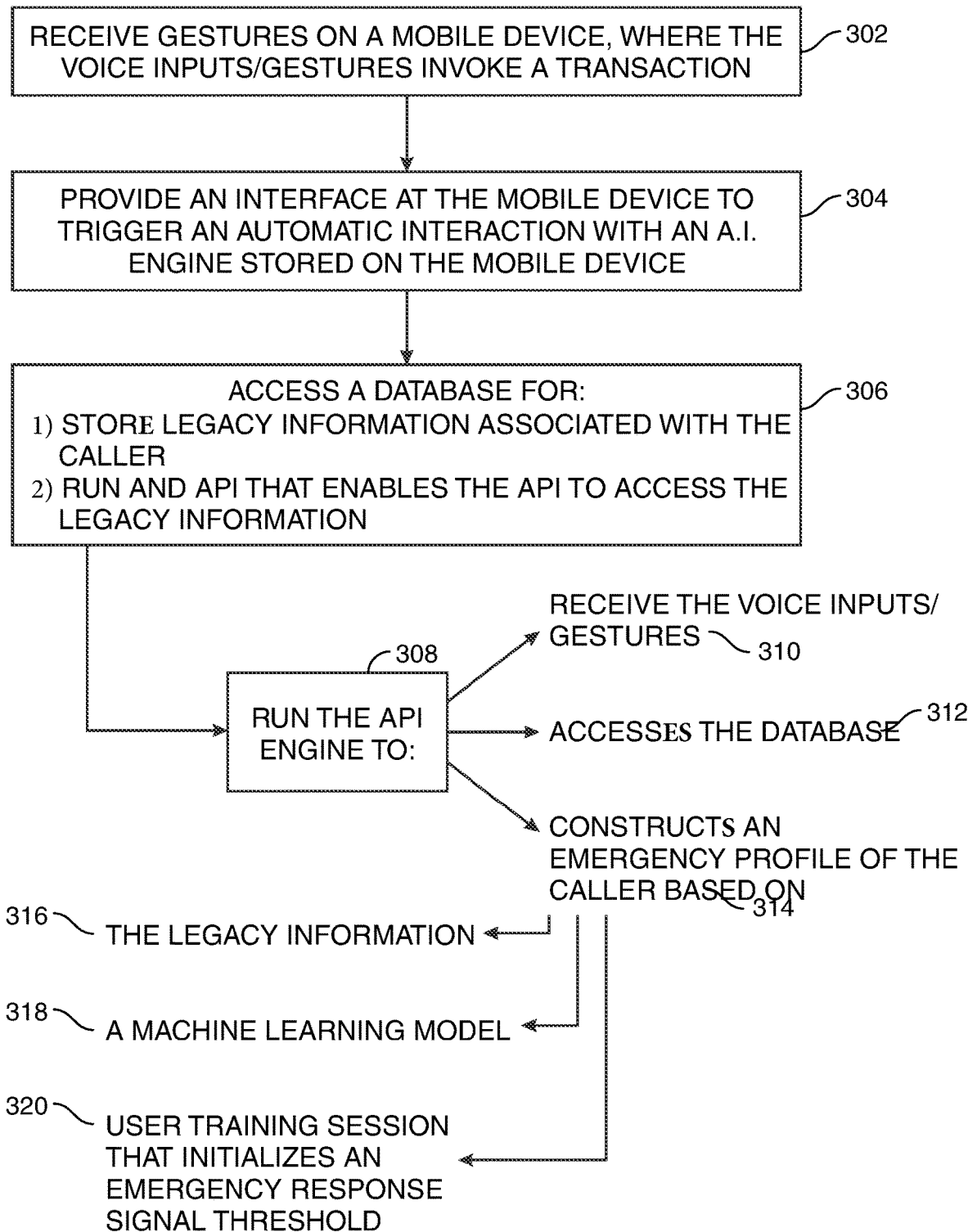
FIG. 3 shows an illustrative flow diagram in accordance with the embodiments of the disclosure.

FIG. 3 shows an illustrative flow diagram in accordance with the embodiments of the disclosure. At 302, a system, or method, according to the disclosure may receive voice inputs and/or gestures on a mobile device, where the voice inputs and/or gestures involve a transaction.

At 304, the system may provide an interface at the mobile device to trigger an automatic interaction with an AI engine stored on the mobile device (or possibly stored remote from the mobile device.) The mobile device may, at 306, access a database for 1) storing legacy information associated with the caller and 2) run an application programming interface (API) that enables the AI to access the legacy information.

Thereafter, at 308, the system may run the AI engine to: receive the voice inputs and/or gestures, access the database and construct an emergency profile of the caller. The emergency profile of the caller may be based on the legacy information 316, a machine learning model 318 and/or a user training session that initializes an emergency response signal threshold for use in determining whether the voice inputs and/or gestures invoke an emergency response.

Figure 4:
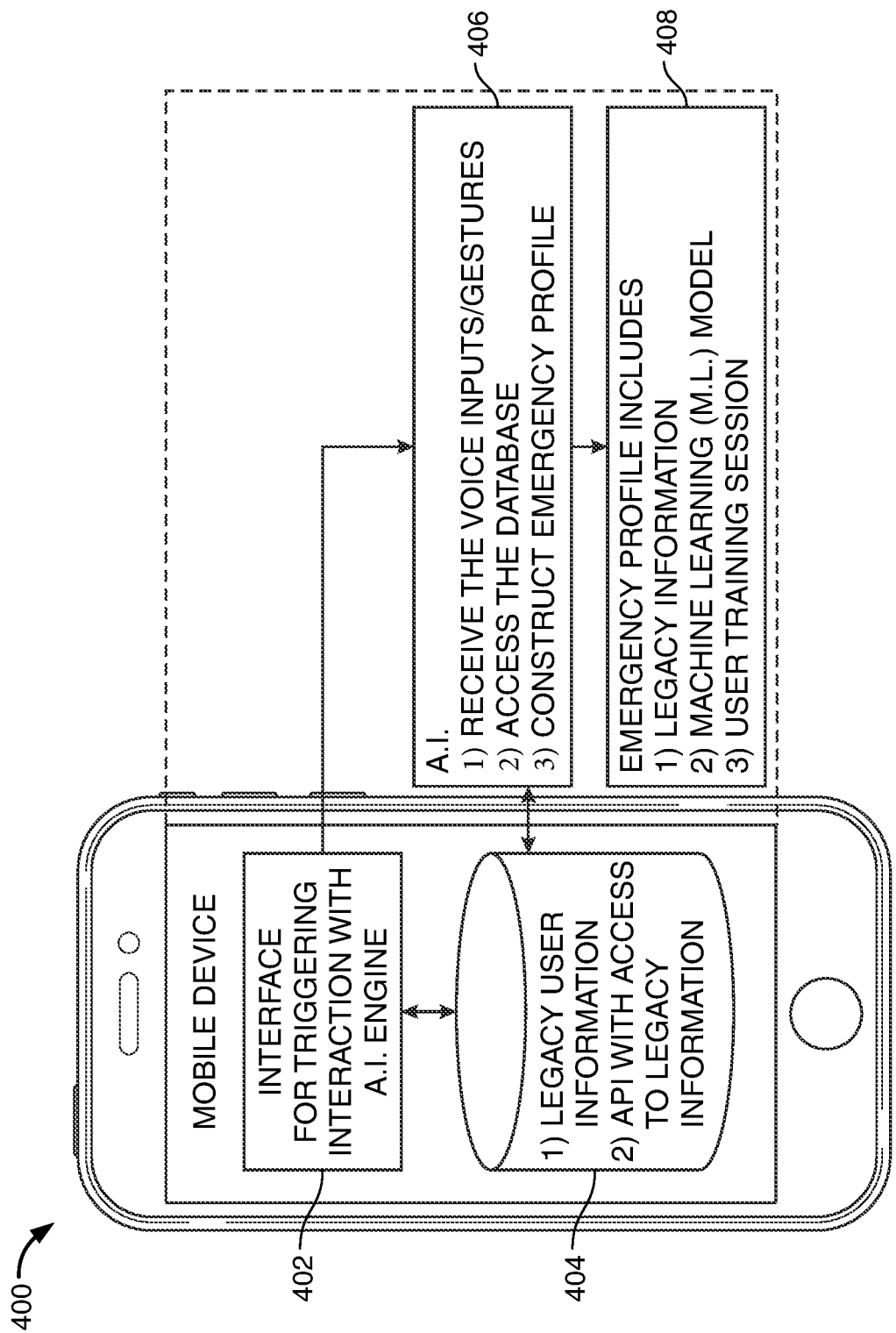
FIG. 4 shows a schematic system diagram of a mobile device in accordance with the embodiments of the disclosure.

FIG. 4 shows a schematic system diagram of a mobile device 400 in accordance with the embodiments of the disclosure. At 402, an interface for triggering an interaction with an AI engine is shown. At 404, a database including 1) legacy user information and 2) an API with access to legacy information is shown. At 406, an AI engine which 1) receives the voice inputs and/or gestures from a caller, 2) accesses database 404 and 3) constructs a caller emergency profile is provided.

At 408, an emergency profile is shown as deconstructed to include 1) legacy information, 2) a machine learning model and 3) a user training session.

Figure 5:
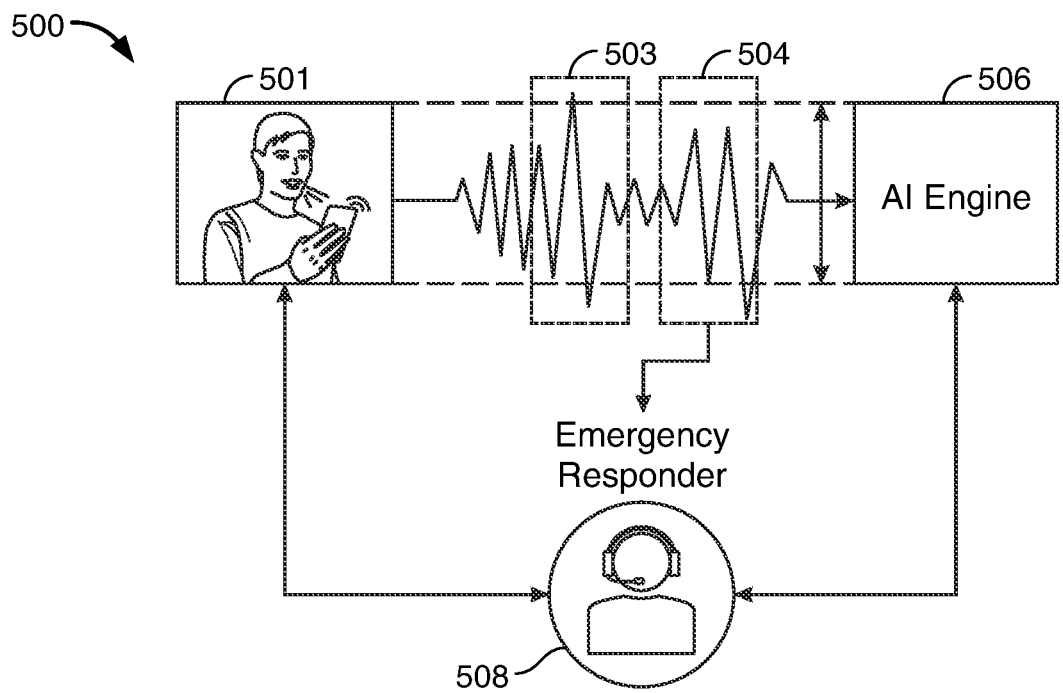
FIG. 5 shows an illustrative initialization scenario in accordance with the embodiments of the disclosure.

FIG. 5 shows illustrative initialization scenario 500. Scenario 500 shows caller 501 using a device to access AI engine 504. Scenario 500 shows that AI engine 504 may analyze initialization voice input provided by caller 501. Initialization voice input provided by caller 501 may include a higher than normal, or higher than threshold decibel level, voice signal. During initialization, such a signal may be relied upon to fix a signal threshold level for a later-in-timer determination as to whether an emergency response is being demanded by a user.

Scenario 500 shows that AI engine 504 has determined that the caller has provided out-of-band—i.e., out of normal range of operation—voice inputs 503 and 504.

It should be noted that the out-of-band characteristic of voice inputs 503 and 504 could be defined by the user in any number of suitable ways.

The AI engine may detect call information by monitoring for user-registered characteristics of voice inputs. While much of the description set forth herein relates to user definition of voice inputs, it should be noted that a user may also define gestures that trigger emergency responses.

Such characteristics may include pitch of sounds (e.g., measured in hertz), duration of sounds (in milliseconds), intensity or loudness (e.g., measured in decibels) and timbre (e.g., measured by energy distribution within a frequency range).

The AI engine may be set by the user to detecting elements of voice inputs that may require an immediate response, as preferably pre-defined by the user. Such elements may be detected based on the measured voice input characteristics.

For example, when the AI engine detects a voice input characteristic or combination of characteristics that indicates a high level stress (of the caller, human agent or both), the AI engine may transfer to an emergency responder. When the AI engine detects that a voice input characteristic or combination of characteristics are nearing levels associated with the user's definition of an indication of stress, the AI engine may transfer to an emergency responder. The user may also be prompted, during initialization, to self-define illustrative characteristics that may indicate stress. These characteristics may include detecting voice inputs having longer length, increased loudness, and differences in timbre.

It should be noted that, at the time of stress, the user may remember or not remember the self-defined stress settings. Nevertheless, the system may default to a setting that provides for emergency response independent of the user's realization at the time of the stressful situation.

With respect to self-definition of gestures, a user may define certain gestures that signal a request for emergency response. For example, a user may indicate with one or more of the user's hands that a first (as photographed by the user's mobile device) shows a call to a law enforcement agency is most appropriate. Alternatively, a hand to the throat may indicate that the user is in physical danger from a source other than another human being and, therefore, may require an emergency response that is not keyed to law enforcement. The examples set forth herein are not meant to be exhaustive, but rather to indicate the availability of gestures as a trigger for an emergency response. In some embodiments, a user may define both voice inputs and gestures as an indicator that an emergency response is requested.

These out-of-band inputs (alternatively referred to herein as "segments") 503 and 504 may be known to, and used by, the caller to signal an emergent situation, possibly associated with a currently-requested transaction, and request thereto an emergency response.

Scenario 500 shows that based on segments 503 and/or 504, AI engine 506 can transfer caller 501 to human agent 506 or other emergency responder. Analysis of segments 503 and 504 may indicate that caller 501 requires an emergency response. For example, AI engine may determine that segments 503 and 504 indicate caller 501 is in physical danger. Further analysis of segments 503 and 504 may trigger AI engine 506 to initiate the transfer to emergency responder 508.

Figure 6:
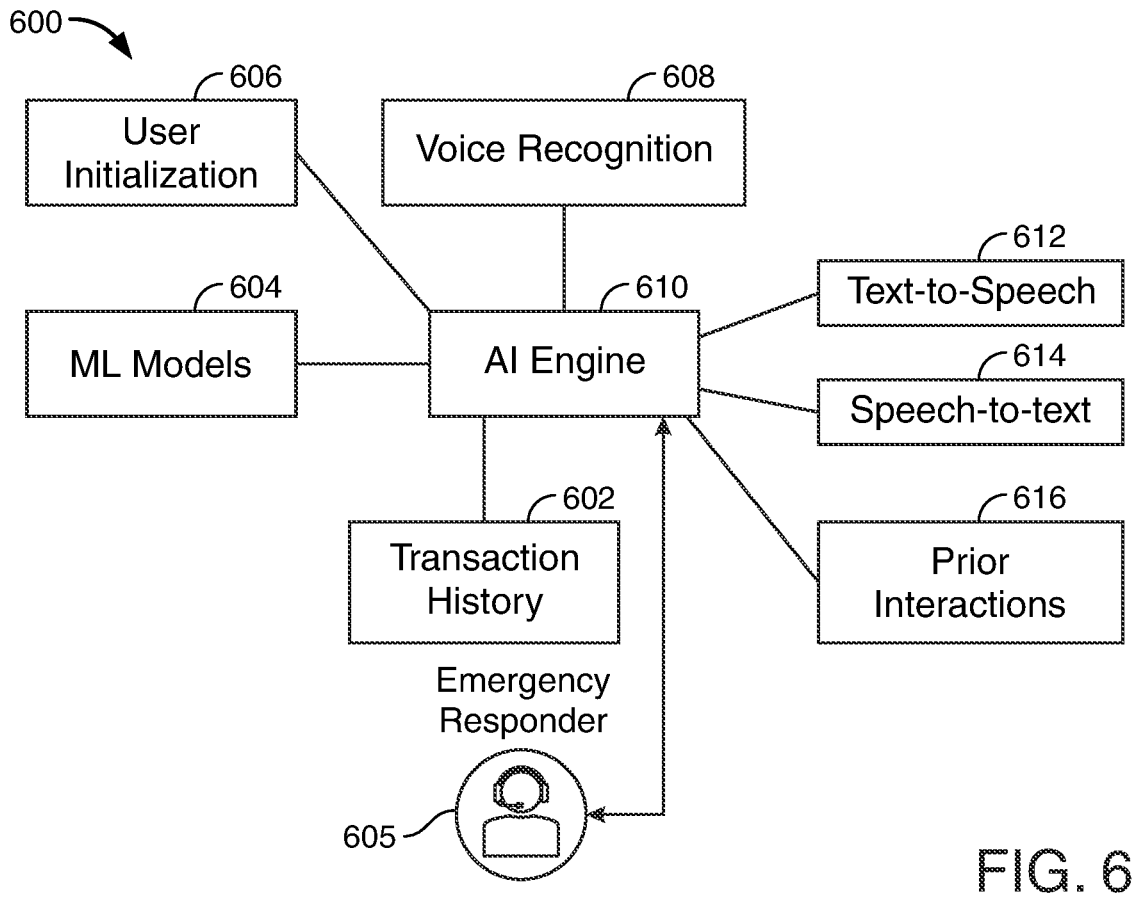
FIG. 6 shows an illustrative system in accordance with the embodiments of the disclosure.
Figure 7:
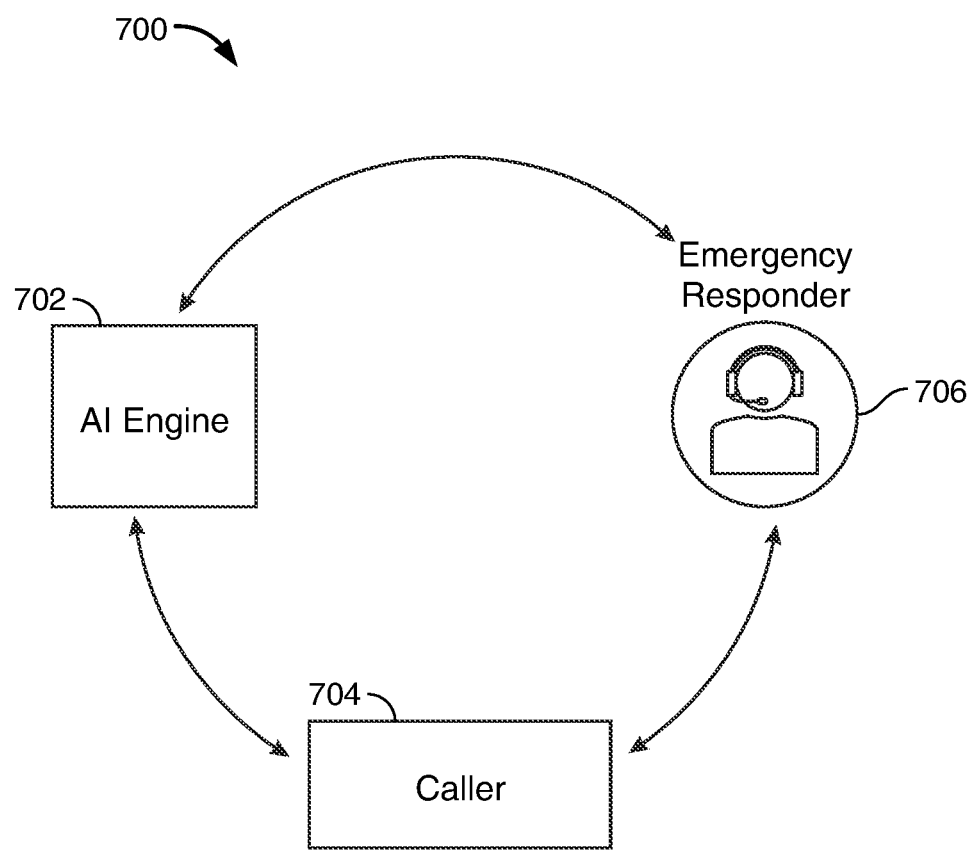
FIG. 7 shows another illustrative scenario in accordance with the embodiments of the disclosure.

FIG. 6 shows illustrative system 600. System 600 shows illustrative inputs that may be utilized by AI engine 610 to construct a persona for interacting with caller 501 (shown in FIG. 5) or with another emergency responder 605.

AI engine 610 may utilize transaction history 602. Transaction history 602 may provide background information regarding caller 501. Transaction history 602 may provide insights into a purpose or goal of caller 501 when interacting with system 100. Transaction history 602 may provide insights into how to interact with caller 501. For example, transaction history 602 may indicate that caller 501 has been assigned a special status within an organization.

AI engine 610 may utilize different machine learning models 604. AI engine 610 may utilize a first machine learning model when interacting with caller 501. AI engine 610 may utilize a second machine learning model when interacting with emergency responder 605. AI engine 610 may utilize a third machine learning model when interacting in parallel with caller 501 and emergency responder 605. AI engine 610 may utilize one or more machine learning models 604 when formulating profiles or personas for the caller.

AI engine 610 may utilize user initialization 606 when determining whether to transfer the call to an emergency responder.

AI engine 610 may utilize records of prior interactions 616. Prior interactions 616 may include records of responses and voice inputs, over time, associated with prior interaction between caller 501 and system 600. Prior interactions 616 may include records of responses and voice inputs associated with prior interaction between caller 501 and emergency responder 605.

It should be noted as well that over time a user voice may change. Accordingly, the level of signal for requesting an emergency response may need to be changed, even absent change by a user. In this case, the system may monitor interactions to make sure that the user-defined levels for requesting emergency response are still valid in view of the changing vocal and/or physical (with respect to gestures) characteristics of the user.

Prior interactions 616 may include machine generated responses that obtained favorable results in the past—whether on behalf of the current caller 501, or a different caller. Prior interactions 616 may include machine generated responses that were rejected by caller 501 or emergency responder 605. During a current interaction, AI engine 610 may construct a persona for communicating with caller 501 or emergency responder 605 based on prior interactions 616.

AI engine 610 may utilize voice recognition module 608. Voice recognition module 608 may translate voice inputs into commands or text understandable by AI engine 610. For example, voice recognition module 608 may translate voice inputs into service requests or problem sets. Voice recognition 608 may identify prosody and semantic information within voice inputs. AI engine 610 may utilize voice recognition module 608. Voice recognition module 608 may translate voice inputs into commands or text understandable by AI engine 610. For example, voice recognition module 608 may translate voice inputs into service requests or problem sets. Voice recognition 608 may identify prosody and semantic information within voice inputs.

AI engine 610 may utilize text-to-speech module 612. Text-to-speech module 612 may convert text formulated by emergency responder 605 into spoken instructions provided to caller 501. Text-to-speech module 612 may convert text formulated by caller 501 into spoken instructions provided to emergency responder 605.

When interacting with emergency responder 605, AI engine 610 may apply a constructed persona to formulate speech with the requisite request level of emergency response that is expected to designate the level of the emergency response of the emergency responder 605.

AI engine 610 may also utilize speech-to-text module 614 as follows. Speech-to-text module 614 may capture voice inputs and translate the voice inputs into text. AI engine 610 may apply a constructed persona to formulate text having linguistic and semantic characteristics expected to designate the level of the emergency response of the emergency responder 605.

These out-of-band inputs may be defined by, known to, and used by, the caller to signal an emergent situation, possibly associated with a currently-requested transaction, and request thereto for an emergency response.

Scenario 700 shows that, based on segments 503 and/or 504 (shown in FIG. 5) the user may define one or more segments to trigger an emergency response. Furthermore, based on segments 503 and/or 504, AI engine 706 can transfer caller 702 to human agent 706 or other emergency responder. Analysis of segments 503 and 504 may indicate that caller 702 requires an emergency response. For example, AI engine may determine that segments 503 and 504 indicates caller 70 is in physical danger. Further analysis of segments 503 and 504 may trigger AI engine 706 to initiate the transfer to emergency responder 708.

Thus, methods and apparatus for VOICE COMMAND WITH EMERGENCY RESPONSE are provided. Persons skilled in the art will appreciate that the present invention can be practiced by other than the described embodiments, which are presented for purposes of illustration rather than of limitation, and that the present invention is limited only by the claims that follow.

What is claimed is:

1. A voice-command based authentication system equipped with a user-definable emergency response, said system comprising:
 a mobile device that, in operation:
  receives voice inputs submitted by a caller, said voice inputs that involve a transaction; and
  provides an interface to trigger an automatic interaction with an artificial intelligence ("AI") engine stored on the mobile device;
 wherein the mobile device comprises a database that is:
  storing legacy information, said legacy information comprising historical data associated with the caller; and
  running an application program interface that is compatible with the AI engine and enables the AI engine to access the legacy information; and
 wherein the mobile device runs the AI engine that, in operation:
  receives the voice inputs generated by the caller;
  accesses the database storing the legacy information;
  constructs an emergency profile of the caller based on:
   the legacy information and/or the voice inputs;
   a machine learning model; and
   a user training session that initializes an emergency response signal threshold level; and
  when the voice inputs exceed the emergency response signal threshold level, the mobile device generates, using machine learning, the emergency response in response to the voice inputs.

2. The system of claim 1, wherein the emergency response is selected from a group comprising:
 a text communication channel;
 a voice communication channel; and/or
 a video communication channel.

3. The system of claim 1, wherein a target of the emergency response is selected from a group comprising:
 a security center;
 a law enforcement entity; and/or
 an alarm system.

4. The system of claim 1, wherein, the mobile device is further configured to receive gestures performed by the caller.

5. The system of claim 4, wherein, the mobile device is further configured to run the AI engine that, in operation:
 accesses the database storing the legacy information;
 revises the emergency profile of the caller based on:
  the legacy information;
  the machine learning model; and
  a level of performance of the emergency response signal threshold level; and
 wherein the AI engine is further configured to revise the emergency response signal threshold level as part of the revision of the emergency profile of the caller.

6. The system of claim 4, wherein, the mobile device is further configured to run the AI engine that, in operation:
 receives the gestures generated by the caller;
 accesses the database storing the legacy information;
 constructs an emergency gesture profile of the caller based on:
  the legacy information;
  a machine learning model; and
  a user training session that initializes the emergency response signal threshold level in response to the gestures performed by the caller; and
 when the gestures performed by the caller exceed the emergency response signal threshold level, the mobile device generates, using machine learning, the emergency response in response to the gestures.

7. The system of claim 6, wherein, the mobile device is further configured to run the AI engine that, in operation:
accesses the database storing the legacy information;
revises the emergency gesture profile of the caller based on:
the legacy information;
the machine learning model; and
a level of performance of the emergency response signal threshold level; and
wherein the AI engine is further configured to revise the emergency response signal threshold level as part of the revision of the emergency gesture profile of the caller.

8. A voice-command based authentication system equipped with a user-definable emergency response, said system comprising:
a mobile device that, in operation:
receives gestures submitted by a caller, said gestures that involve a transaction; and
provides an interface to trigger an automatic interaction with an artificial intelligence ("AI") engine stored on the mobile device;
wherein the mobile device comprises a database that is:
storing legacy information, said legacy information comprising historical data associated with the caller; and
running an application program interface that is compatible with the AI engine and enables the AI engine to access the legacy information; and
wherein the mobile device runs the AI engine that, in operation:
receives the gestures generated by the caller;
accesses the database storing the legacy information;
constructs an emergency profile of the caller based on:
the legacy information and/or the gestures;
a machine learning model; and
a user training session that initializes an emergency response signal threshold level; and
when the gestures exceed the emergency response signal threshold level, the mobile device generates, using machine learning, the emergency response in response to the gestures.

9. The system of claim 8, wherein the emergency response is selected from a group comprising:
a text communication channel;
a voice communication channel; and/or
a video communication channel.

10. The system of claim 8, wherein a target of the emergency response is selected from a group comprising:
a security center;
a law enforcement entity; and/or
an alarm system.

11. The system of claim 10, wherein, the mobile device is further configured to run the AI engine that, in operation:
accesses the database storing the legacy information;
revises the emergency profile of the caller based on:
the legacy information;
the machine learning model; and
a level of performance of the emergency response signal threshold level; and
wherein the AI engine is further configured to revise the emergency response signal threshold level as part of the revision of the emergency profile of the caller.

12. The system of claim 8, wherein the mobile device is further configured to receive voice inputs, said voice inputs that also involve the transaction, submitted by the caller.

13. The system of claim 12, wherein, the mobile device is further configured to run the AI engine that, in operation:
receives the voice inputs generated by the caller;
accesses the database storing the legacy information;
constructs an emergency gesture profile of the caller based on:
the legacy information;
a machine learning model; and
a user training session that initializes the emergency response signal threshold level in response to the voice inputs performed by the caller; and
when the voice inputs submitted by the caller exceed the emergency response signal threshold level, the mobile device generates, using machine learning, the emergency response in response to the gestures.

14. A method for triggering a user-definable emergency response in a voice-command based authentication system equipped with the user-definable emergency response, said method comprising:
receives gestures on a mobile device, said gestures submitted by a caller, said gestures that involve a transaction; and
providing an interface at the mobile device to trigger an automatic interaction with an artificial intelligence ("AI") engine stored on the mobile device;
wherein the method is configured to access a database that is:
storing legacy information, said legacy information comprising historical data associated with the caller; and
running an application program interface that is compatible with the AI engine and enables the AI engine to access the legacy information; and
running the AI engine to:
receive the gestures generated by the caller;
access the database storing the legacy information;
construct an emergency profile of the caller based on:
the legacy information and/or the gestures;
a machine learning model; and
a user training session that initializes an emergency response signal threshold level; and
when the gestures exceed the emergency response signal threshold level, generating, using machine learning, the emergency response in response to the gestures.

15. The method of claim 14, wherein the emergency response is selected from a group comprising:
a text communication channel;
a voice communication channel; and/or
a video communication channel.

16. The system of claim 14, wherein a target of the emergency response is selected from a group comprising:
a security center;
a law enforcement entity; and/or
an alarm system.

17. The method of claim 14, wherein, the mobile device is further configured to receive voice inputs submitted by the caller.

18. The method of claim 17, wherein, the mobile device is further configured to run the AI engine that, in operation:
receives the voice inputs generated by the caller;
accesses the database storing the legacy information;
constructs an emergency gesture profile of the caller based on:
the legacy information;
a machine learning model; and a user training session that initializes the emergency response signal threshold level in response to the voice inputs performed by the caller; and when the voice inputs submitted by the caller exceed the emergency response signal threshold level, the mobile device generates, using machine learning, the emergency response in response to the gestures.

\* \* \* \* \*